United States Patent [19]
Murphy et al.

[11] Patent Number: 5,510,776
[45] Date of Patent: Apr. 23, 1996

[54] MULTIPLE MESSAGE SELECTIVE TELLTALE DISPLAY

[75] Inventors: Morgan D. Murphy, Kokomo; Diego A. Borrego, Lafayette; Steven G. Skiver, Kokomo, all of Ind.

[73] Assignee: Delco Electronics Corporation, Kokomo, Ind.

[21] Appl. No.: 140,949

[22] Filed: Oct. 25, 1993

[51] Int. Cl.⁶ .............................. G05B 23/02; G09G 3/00
[52] U.S. Cl. .................. 340/825.17; 340/815.54; 345/32
[58] Field of Search ............. 340/825.17, 815.45, 340/815.54, 815.65, 825.51, 815.74, 815.81, 309.4; 345/4, 5, 6, 32; 353/13, 14; 382/35

[56] References Cited

U.S. PATENT DOCUMENTS

| | | | |
|---|---|---|---|
| 2,981,941 | 4/1961 | Ogle | 345/32 |
| 3,103,646 | 9/1963 | Sheaffer, Jr. et al. | 382/35 |
| 3,286,585 | 11/1966 | McCullough et al. | 345/32 |
| 3,366,950 | 1/1968 | Wilson | 340/815.54 |
| 3,370,272 | 2/1968 | Kenedi | 340/825.51 |
| 4,179,690 | 12/1979 | Nicholls | 340/815.45 |
| 4,575,718 | 3/1986 | Ludowyk | 340/825.17 |
| 5,194,854 | 3/1993 | Havel | 340/815.65 |

Primary Examiner—Alyssa H. Bowler
Assistant Examiner—Mark H. Rinehart
Attorney, Agent, or Firm—Jimmy L. Funke

[57] ABSTRACT

A plurality of optical projectors focus telltale messages, one at a time, onto a vehicle instrument panel display area. In one embodiment a logic circuit assigns priority to the messages and displays only the message of higher priority when more than one message is prompted. The projection lamps are high intensity LEDs arranged in parallel but having diodes in series with lower priority lamps to hold them off when a higher priority lamp is energized. A constant current source regulates the LED current. In another embodiment two message lamps are controlled by a logic circuit such that when both are prompted for display an oscillator causes the messages to be displayed alternately, but when either message alone is prompted, its lamp will be energized continuously.

6 Claims, 2 Drawing Sheets

MULTIPLE MESSAGE SELECTIVE TELLTALE DISPLAY

FIELD OF THE INVENTION

This invention relates to instrument panel displays and particularly to singular display of multiple telltale messages.

BACKGROUND OF THE INVENTION

It is desired to provide the operator of an automotive vehicle with as much information as is useful. The instrument panel is the standard medium for displaying such information. Some information, such as speed, is always displayed, while other information such as warnings of engine temperature, low water, or low oil pressure may be displayed only when an adverse condition exists. Such warning displays are termed "telltale" indicators or messages. The space available in instrument panels is often quite limited, so that there is not enough room to adequately dedicate space to each the desired messages.

It has been proposed to provide more information in a small space by reconfigurable displays which require substantial electronic support and high cost. Also reconfigurable telltale systems have been developed to sequentially display telltale messages. These telltale systems also tend to be expensive and moreover often require large package sizes. The versatility of reconfigurable telltale systems is desirable, but small package size and low cost are also desired along with system simplification.

SUMMARY OF THE INVENTION

It is therefore an object of the invention to display multiple telltale messages on a display area large enough for only one such message with a relatively inexpensive and simple system.

The invention is carried out by optical projectors with separate lamps and unique messages for projecting a number of telltale messages on the same display area, and a control for selecting one message or at least one message at a time when more than one message is prompted by condition sensors. In particular, according to one embodiment, priorities are assigned to the messages and a logic circuit energizes the projector lamp for the message of highest priority of those which are prompted, thereby displaying just one message on the display area. Another embodiment uses logic circuitry to alternately display two messages of similar priority when both messages are prompted, and to display one of the messages continuously when only one is prompted.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
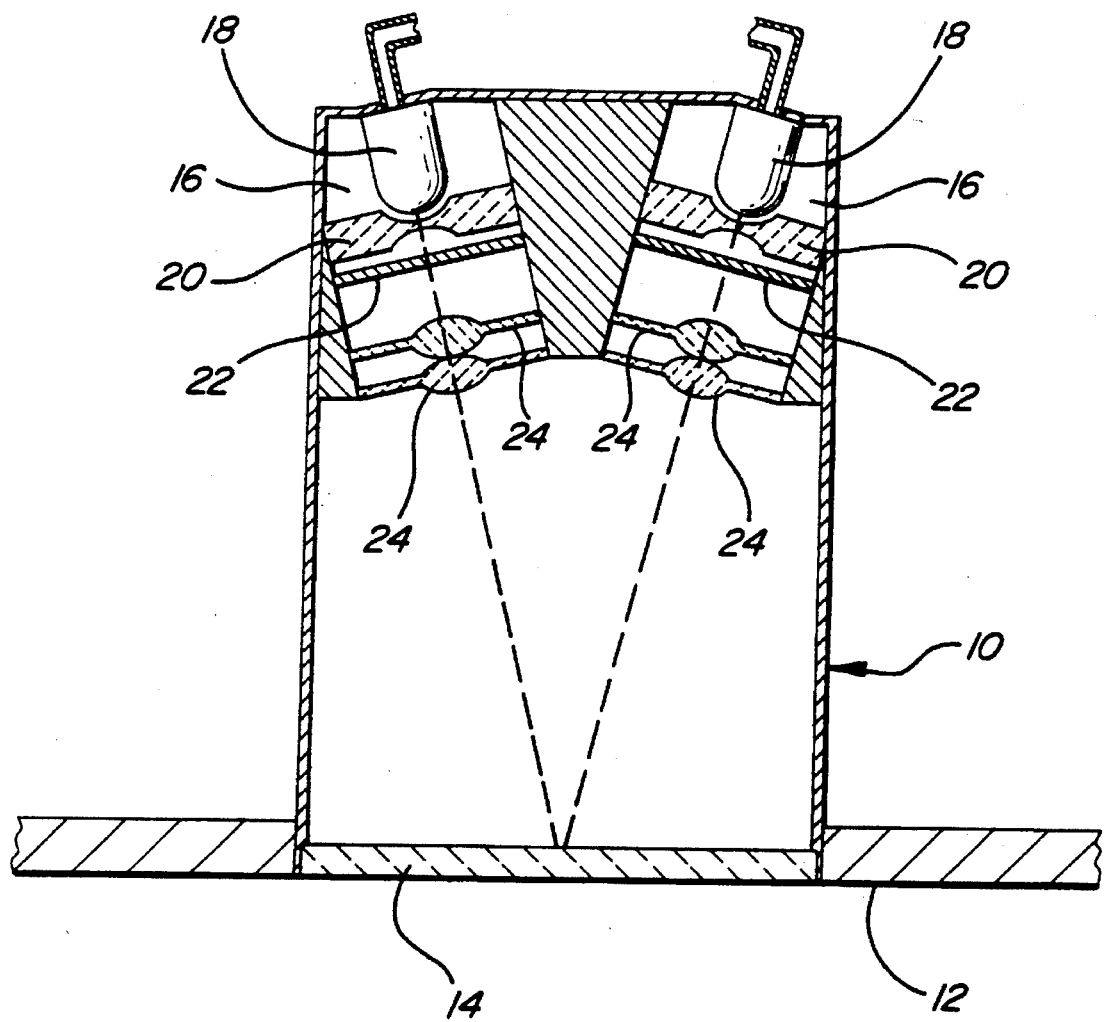
FIG. 1 is a cross section of an optical projection apparatus according to the invention.

Referring to FIG. 1, a telltale housing 10 is mounted on a vehicle instrument panel 12 and has a translucent end screen 14 in the plane of the panel 12. The housing 10 is mounted to the rear of the instrument panel 12 (relative to the vehicle operator) and the screen 14 comprises a display area in the view of the operator and just large enough to accommodate one telltale message. The rear of the housing supports a plurality of optical projection units 16 for projecting telltale messages onto the screen 14. Each projection unit comprises a lamp 18, such as a high intensity LED, a lens 20 to focus the illumination from the lamp, a transparency 22 bearing an image of a telltale message, and focusing lenses 24 for focusing the image, when illuminated, onto the screen 14. The optical axis of each projection unit is tilted relative to the housing longitudinal axis so that each message is centered on the screen 14 even though the projection units 16 are each laterally displaced from the housing longitudinal axis. While the cross section of the drawing shows two projection units, it will be appreciated that additional units can be incorporated in other planes and focused onto the same display area. Thus four or more messages can be allotted to one small screen for operator viewing. When a lamp 18 is illuminated the corresponding message is projected onto the display area. Circuitry must be provided to insure that only one message at a time is presented.

A schematic circuit for selectively illuminating the lamps 18 for a system having three projection units and thus three lamps, shown here as LEDs 18a, 18b and 18c. Sensors 30 responsive to various vehicle conditions provide inputs to a control circuit 32 which supplies 12 volts from battery 34 to lamps for illuminating messages corresponding to the conditions. A priority is assigned to the conditions and the LEDs are arranged according to that priority. Thus LED 18a has priority higher than 18b, and LED 18b has higher priority than 18c. The conditions sensed may be, for example, in order of priority, brakes, coolant temperature and windshield washer fluid level. Obviously, a warning of brake failure should not be preempted by conditions of lesser concern.

While the anodes or high voltage sides of the LEDs are selectively connected to the battery voltage, the cathodes or low voltage sides are connected to a constant current source 36 which includes an input resistor 38 and a control resistor 40 for determining the current value. A suitable current value is, for example, 20 ma. The LED 18a is directly connected to the resistor 38, the LED 18b is connected through a diode 42 to the resistor 38, and the LED 18c is serially connected through diodes 44 and 42 to the resistor 38. A bleed resistor 46 connected from battery voltage to a node between the diode 42 and the resistor 38 tends to pull up the voltage at that node to prevent current bleed in LEDs when more than one is prompted.

In operation, when any one of the sensors is triggered by detection of a condition, the control circuit prompts the LED corresponding to that condition by applying battery voltage to it and current passes through that LED and any diode in circuit with that LED to the current source 36, thereby illuminating that LED. If, however, two sensors are prompted, energizing current passes through the higher priority of the two, and the lower priority LED is not illuminated. For example, if the high voltage sides of LEDs 18a and 18b are prompted, the combination of LED 18b and diode 42 is in parallel with the LED 18a. Then the LED 18a conducts so that the voltage across the combination of LED 18b and diode 42 is only one diode drop which is insufficient to permit conduction through the lower priority path. The same principle applies when any two or all three of the LEDs are prompted. Of course the circuit can be adapted to accommodate a number of lamps 18 other than three.

Figure 2:
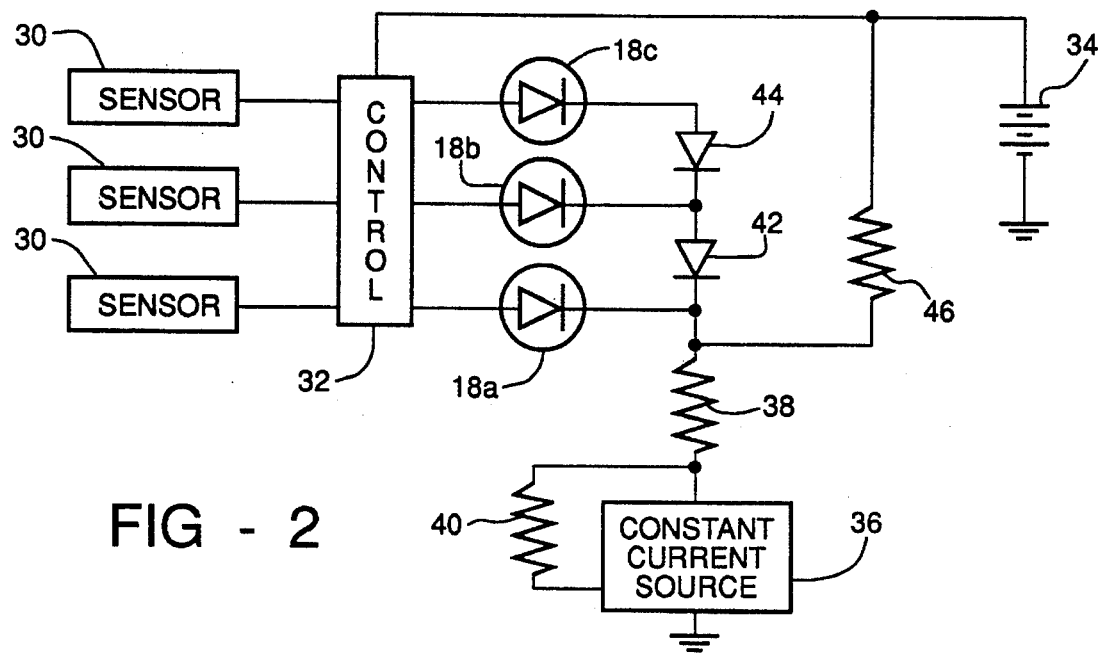
FIG. 2 is a schematic diagram of a circuit, according to the invention, for operating the apparatus of FIG. 1 to display the message of highest priority of those messages prompted.
Figure 3:
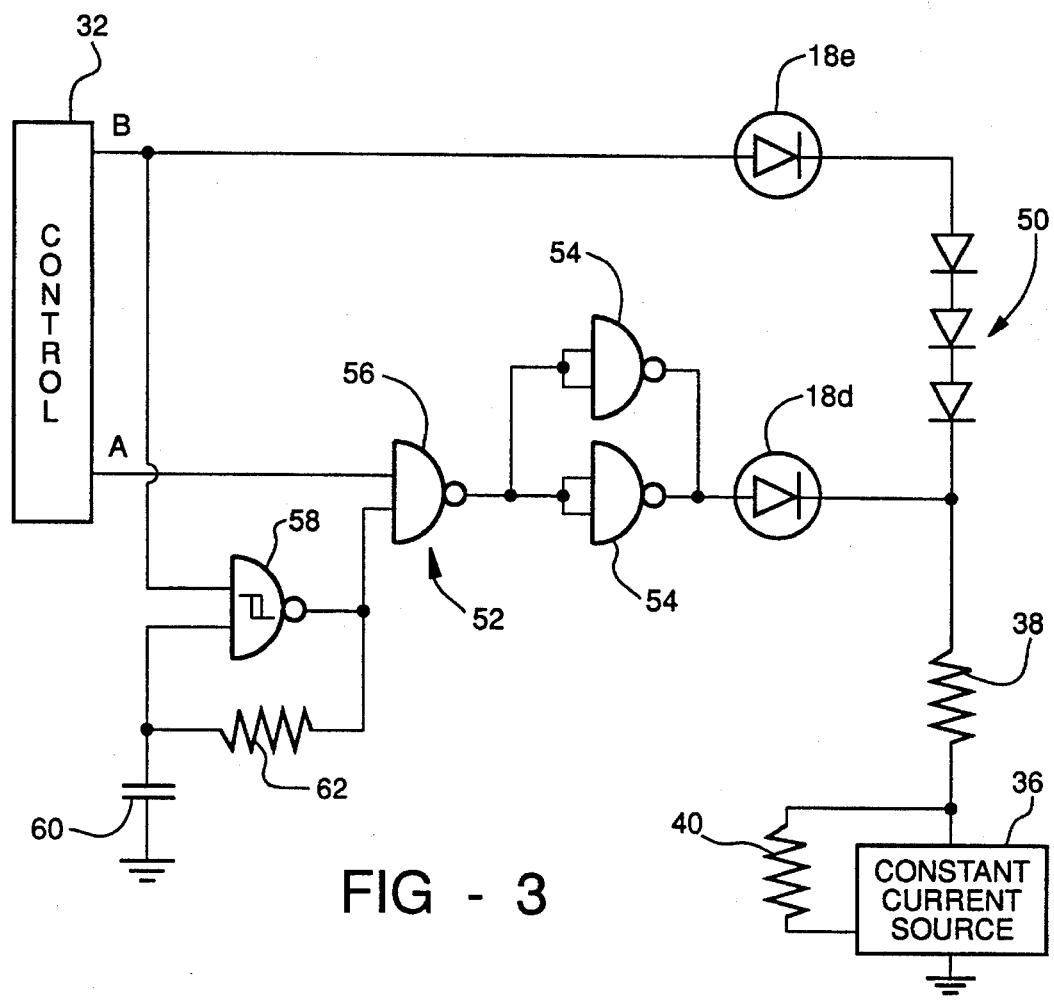
FIG. 3 is a schematic diagram of a circuit, according to another embodiment of the invention, for operating the apparatus of FIG. 1 to alternately display two messages when both are prompted.

A circuit for displaying two messages of nearly equal priority is shown in FIG. 3. The control 32 and the constant current source 36 and its resistors 38 and 40 are equivalent to those shown in FIG. 2. Lines A and B from the control 32 couple the prompt signal to the lamps or LEDs 18d and 18e. The LEDs 18d and 18e are any two lamps adjacent in priority among a group of lamps, or they may be the only two lamps in a telltale projector. The LED 18e is connected directly to the line B and it is further connected through three diodes 50 to resistor 38 of the current source 36, so that if line B alone is prompted the LED 18e will be energized. The line A is connected to the LED 18d through a NAND logic circuit 52 which is effective to continually energize the LED 18d if the line A alone is prompted, and to turn the LED 18d on and off periodically if both lines A and B are prompted. The latter condition allows the LED 18e to turn on when LED 18d is off, so that the two messages are displayed alternately.

The NAND circuit 52 comprises a quad Schmidt trigger NAND gate including a pair of NAND gates 54 in parallel for driving the LED 18d with all inputs coupled to the output of a third NAND gate 56 which has one input tied to line A. A Schmidt trigger NAND gate 58 is connected in an oscillator circuit and has one input connected to line B, the second input connected through a timing capacitor 60 to ground, and its output connected to an input of gate 56 as well as being connected through a resistor 62 to the second input. The oscillator is operative whenever line B is prompted, applying a high signal to the first input of gate 58. Then, assuming the second input is initially low, the output will be high, causing the capacitor 60 to charge through the resistor 62 until the trigger level of the gate is reached, causing the output to go low and discharge the capacitor 60. If, during the oscillation the line A is low, the LED 18d will remain off and the LED 18e will be illuminated continuously. However if the line A is high during the oscillation, the NAND gate 56 and thus the LED 18d will be turned on and off, causing the LED 18e to also turn on and off in counter phase. The period of such oscillation is determined by the RC constant of the circuit and is selected to permit legibility of both messages which are displayed alternately.

It will thus be seen that the invention permits a number of telltale messages to be displayed in the same space, a given message being displayed whenever only it is prompted, and if more than one is prompted the messages are displayed according to a predetermined priority or are displayed alternately.

The embodiments of the invention in which are exclusive property or privilege is claimed are defined as follows:

1. In an instrument panel having a display area sufficient to display only one telltale message at a time, apparatus for selectively showing any one of a plurality of telltale messages on the display area comprising:

a plurality of optical projectors each for projecting a message onto the display area;

each optical projector comprising a message image transparency, a lamp for illuminating the transparency, and optics for projecting a message onto the display area, each lamp being assigned a priority with respect each other lamp;

control means for prompting message display, wherein more than one message at a time may be prompted, the control means being coupled to each lamp to selectively apply energizing voltage to each lamp in accordance with messages being prompted; and a logic circuit coupled to the lamps and responsive to the control means for selectively energizing the lamps for displaying prompted messages one at a time, wherein the logic circuit includes at least one diode connected in series with a first lamp for preventing current low through the first lamp when energizing voltage is simultaneously applied to the first lamp and to a second lamp, and the assigned priority of the first lamp is less than or equal to the assigned priority of the second lamp.

2. The invention as defined in claim 1, wherein:

the logic circuit includes means operative when both lamps are prompted to periodically disable energization of the second lamp, whereby the first lamp is periodically energized out of phase with the second lamp.

3. The invention as defined in claim 1 wherein the lamps are LEDs.

4. In an instrument panel having a display area sufficient to display only one telltale message at a time, apparatus for selectively showing any one of a plurality of telltale messages on the display area comprising:

a plurality of optical projectors each for projecting a message onto the display area;

each optical projector comprising a message image transparency, a lamp for illuminating the transparency, and optics for projecting a message onto the display area, wherein the lamps are assigned an order of priority;

control means for prompting message display, wherein more than one message at a time may be prompted and the control means is coupled to a high voltage side of each lamp to selectively apply energizing voltage to each lamp; and a logic circuit coupled to the lamps and responsive to the control means for selectively energizing the lamps for displaying prompted messages one at a time, the logic circuit comprising means for coupling a low voltage side of a highest priority lamp to ground and a diode in series with a low voltage side of a lower priority lamp and coupled to the low voltage side of the highest priority lamp, whereby the diode is nonconductive to prevent energization of the lower priority lamp when the highest priority lamp is energized.

5. In an instrument panel having a display area sufficient to display only one telltale message at a time, apparatus for selectively showing any one of a plurality of telltale messages on the display area comprising:

a plurality of optical projectors each for projecting a message onto the display area;

each optical projector comprising a message image transparency, a lamp for illuminating the transparency, and optics for projecting a message onto the display area, wherein the lamps are assigned an order of priority;

control means for prompting message display, wherein more than one message at a time may be prompted and the control means is coupled to a high voltage side of each lamp to selectively apply energizing voltage to each lamp; and a logic circuit coupled to the lamps and responsive to the control means for selectively energizing the lamps for displaying prompted messages one at a time, the logic circuit comprising diode means serially connected at a low voltage side of lamps other than the highest priority lamp for preventing conduction in lamps of lower priority than any energized lamp.

6. In an instrument panel having a display area sufficient to display only one telltale message at a time, apparatus for selectively showing any one of a plurality of telltale messages on the display area comprising:

a plurality of optical projectors each for projecting a message onto the display area;

each optical projector comprising a message image transparency, a lamp for illuminating the transparency, and optics for projecting a message onto the display area, wherein the lamps are assigned an order of priority;

a constant current source to regulate lamp current;

control means for prompting message display, wherein more than one message at a time may be prompted; and a logic circuit coupled to the lamps and responsive to the control means for selectively energizing the lamps for displaying prompted messages one at a time, wherein the lamps are connected in parallel paths between the control means and the current source, each path including a lamp and one or more diodes in series with the respective lamp other than the highest priority lamp with the number of diodes increasing for decreasing priority, so that the conduction of any lamp above lowest priority prevents conduction through the diodes of lower priority lamps.

* * * * *